Oct. 21, 1969    W. LUDWIG    3,473,991
METHOD FOR BONDING A PLASTIC FOAM PAD ONTO, AND WITHOUT
WARPING, A HEAT-WARPABLE THERMOPLASTIC BODY MEMBER
Filed March 16, 1966
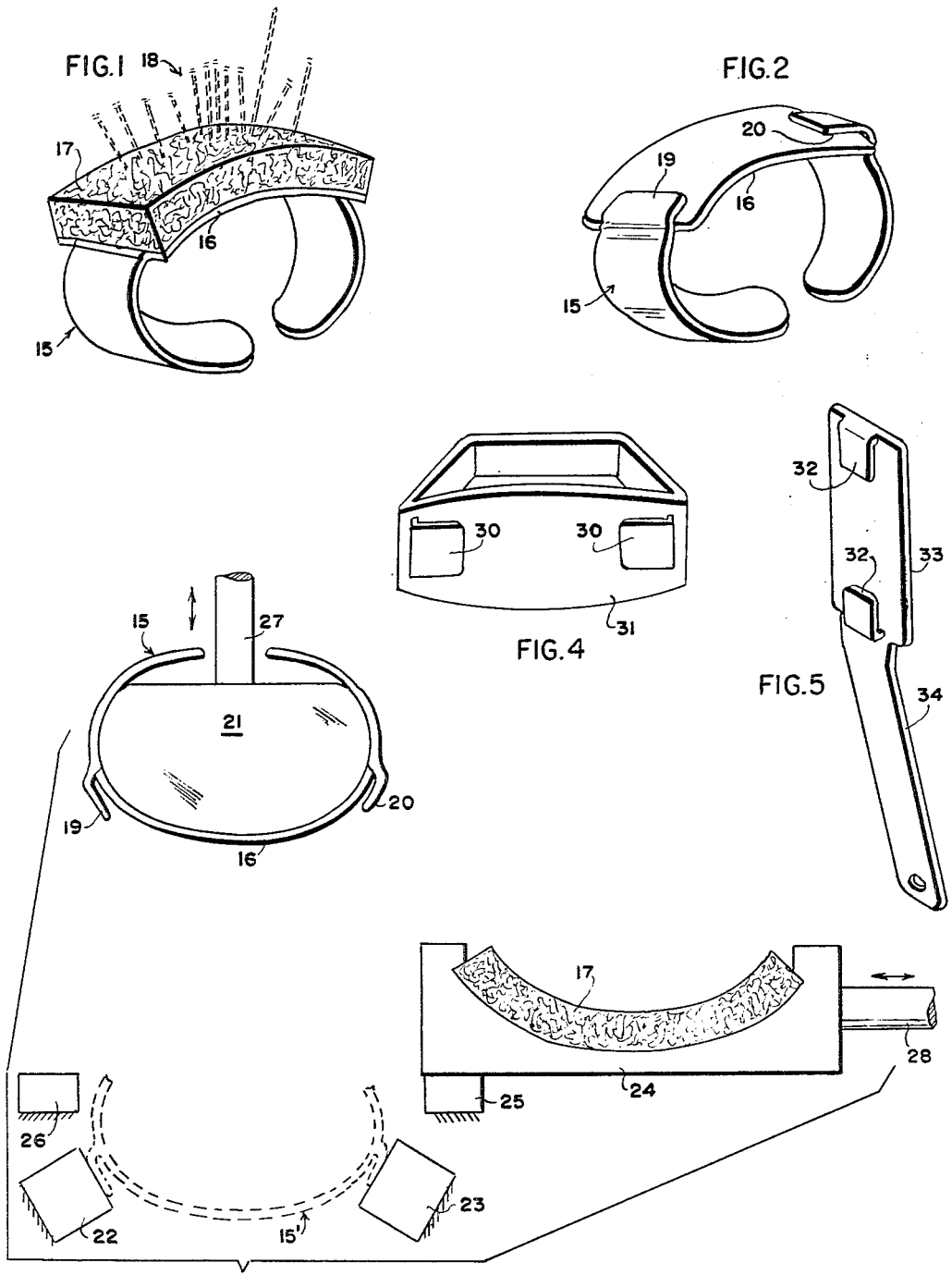
INVENTOR,
Walter Ludwig,
BY
ATTORNEY.

United States Patent Office 3,473,991
Patented Oct. 21, 1969

3,473,991
METHOD FOR BONDING A PLASTIC FOAM PAD ONTO, AND WITHOUT WARPING, A HEAT-WARPABLE THERMOPLASTIC BODY MEMBER
Walter Ludwig, East Orange, N.J., assignor to Pentapco, Inc., Elizabeth, N.J., a corporation of New Jersey
Filed Mar. 16, 1966, Ser. No. 534,836
Int. Cl. B32b 31/24; B29c 27/02
U.S. Cl. 156—306                    2 Claims

ABSTRACT OF THE DISCLOSURE

A stiff thermoplastic backing element is formed with tabs extending over and slightly spaced from the surface of said member which is to be covered by the plastic foam pad. Heat is applied to the upper surface of each tab to soften a layer thereof. Then upon placing the pad onto the tacky tabs and pressed thereagainst, tacky material enters crevices in the pad body. The assembly is allowed to cool and set. The method is shown applied in the making of a bracelet to serve as a pin cushion, and in lint brush constructions.

---

The present invention relates to, and its principal object is to provide a novel method using heat and pressure to attach a pad of foam plastic or the like onto a stiff thermoplastic backing element whose shape the heat must not be allowed to warp. This method is particularly adaptable where the backing element is part of the body of a bracelet or ring form, any shaped form, or has a handle integral therewith which is to remain in a definite relation thereto.

Another object of this invention is to provide a novel and improved method of the character mentioned, which is cheap and easy to practice and efficient in carrying out the purposes for which it is designed.

Other objects and advantages will become apparent as this disclosure proceeds.

For one practice of this invention, the backing element is formed with tabs integral therewith, extending over and slightly spaced from the surface of the backing member which is to receive the pad. Heat is applied to the top surface of each tab to soften a surface layer thereof. Then the pad is placed on the softened tabs and forcibly pressed thereagainst to force the tacky material of said surface layers of the tabs to enter crevices in the pad body, and of course, the assembly is allowed to cool and set.

I have chosen as illustrative examples of the use of this method, the making of a bracelet to serve as a wrist pin cushion, and two forms of lint brushes. It will be evident that said bracelet may also be used as a lint brush. These items are shown in the accompanying drawing forming part of this specification, wherein similar characters indicate corresponding parts in all the views.

FIG. 1 is a perspective view of a pin cushion bracelet whose components were assembled by the method taught herein.

FIG. 2 shows the bracelet before the pad was attached thereto.

FIG. 3 is a fragmentary view indicating one form of apparatus for assembling the bracelet and its pad, by the method set forth herein.

FIGS. 4 and 5 are perspective views of handle-carried backing elements, which when pads are mounted thereon, will serve as lint brushes.

In the drawing, the numeral 15 designates generally a one-piece bracelet structure of thermoplastic material having some resiliency, whose central portion 16 is to be covered by and carry a pad 17 of plastic foam or the like, on the bracelet's periphery, to serve as a cushion for pins and needles indicated generally by the numeral 18 and shown by the broken lines in FIG. 1. Ordinary methods to heat seal the pad onto the backing element 16, are unsatisfactory because the bracelet form becomes distorted by the heat, and riveting, besides being costly by comparison, would present rivet heads against the wrist of the wearer, which occurrence is found objectionable.

The bracelet 15 is formed with spaced tabs 19, 20, one at each end of the backing element 16. Each tab extends from the bracelet body, along and slightly spaced over the upper surface 16' of the backing element. The rubbery cellular pad, herein indicated as plastic foam, shall be deemed to include any foam rubber or similar material. To mount the pad 17, the exposed surfaces of the tabs 19, 20 are heated to soften a surface layer of appreciable depth, and while such tab surfaces are still tacky, the pad is applied thereon with pressure for a short interval of time, and then allowed to cool and set. Since the heat applied never exceeds more than to soften even the whole of the tabs, any portion of the heat reaching the bracelet body proper, will be insufficient to cause it to warp in any degree.

In FIG. 3, an apparatus is suggested for the practice of the method taught herein, for making the assembly shown in FIG. 1. The numeral 21 denotes a vertically movable mandrel on which the bracelet 15 is mounted in inverted position, so upon downward stroke of said laden mandrel, the tabs 19 and 20 will be pressed against the electric heaters 22 and 23, respectively, and there held awhile in position as shown in broken lines 15', until the tabs are softened without materially bending them. Then the mandrel is quickly raised to its upward position whereupon slide 24 carrying a pad 17, is quickly slid to rest on the supports 25, 26, in true position in relation to the bracelet 15 carried on the mandrel. Quickly thereafter, the mandrel is again lowered, whereupon the tacky tabs 19, 20 will be forced against the pad, compress it, and become attached thereto. The numerals 27 and 28 indicate the rams of pneumatic cylinders not shown, which are arranged to operate in proper timed relation to accomplish the required movements of the mandrel 21 and the slide 24, no further description of which need be given, for such control system, in view of what is already known in the machine art, would be the ordinary routine work of a machine designer, and further, no claim is made herein to the apparatus per se. This method can be practiced by hand operations or by machine.

FIG. 4 shows a thermoplastic ring-shaped body member. After bonding a plastic foam pad thereto onto its tabs 30 to cover the backing portion 31, in the manner set forth, the article will serve as a lint brush. Likewise, when the same is done on the bent form of FIG. 5, onto the tabs 32 to cover the backing portion 33 which is angularly disposed in relation to the straight handle portion 34. It is evident that no warping will take place in these shaped, heat-warpable body members by the heat applied to their tabs. Even if the tabs are deformed, the heat will not effect the shapes of the body members.

The body portions, their backing portions and the tabs may be of any shape. The pad preferably conforms to the backing element it is to be bonded to. The tabs are preferably large enough so there is no appreciable overhang of the pad beyond the margins of the body member. The roots of the tabs may be inward of the backing portion as in FIG. 4, or they may emerge from other suitable regions of the body member. It is preferred that the pad shall cover tabs and extend beyond them to hide them, unless the design of the article shall demand otherwise.

This invention is capable of being practiced in various ways and in numerous applications without departing from the essential features herein disclosed.

I claim:
1. The method for bonding a plastic foam pad onto, and without warping, a heat-warpable thermoplastic body member having a backing portion for the pad, which comprises first providing said body member with at least one tab integral therewith and extending therefrom along and slightly spaced from the surface of the backing portion which is to be covered by said pad, then applying heat onto the exposed surface of the tab to soften and make it tacky in at least a surface layer thereof, then setting the pad onto said tacky surface to cover the backing portion, then pressing said pad forcibly against said tacky surface so it becomes bonded thereto and finally allowing said tab to cool.
2. The method as defined in claim 1, wherein the number of tabs provided the body member is at least two in spaced relation along the backing portion; the heating of the exposed surfaces of said tabs being done simultaneously and the pressing of the pad against them being done simultaneously.

References Cited
UNITED STATES PATENTS

| | | | |
|---|---|---|---|
| 2,058,340 | 10/1936 | Miller | 224—28 X |
| 2,605,032 | 7/1952 | Hunt et al. | 223—109 |
| 2,940,096 | 6/1960 | Bromfield. | |
| 2,952,998 | 9/1960 | Lawrence | 156—306 X |
| 3,234,756 | 2/1966 | Hanson | 63—14 |

HAROLD ANSHER, Primary Examiner

R. A. KILLWORTH, Assistant Examiner

U.S. Cl. X.R.

156—322; 223—109; 224—28